United States Patent [19]

Draim

[11] Patent Number: 4,809,935
[45] Date of Patent: Mar. 7, 1989

[54] SATELLITE CONTINUOUS COVERAGE CONSTELLATIONS

[75] Inventor: John E. Draim, Vienna, Va.

[73] Assignee: Analytic Services, Inc., Arlington, Va.

[21] Appl. No.: 760,905

[22] Filed: Jul. 31, 1985

[51] Int. Cl.$^4$ ............................................. B64G 1/10
[52] U.S. Cl. ............................................. 244/158 R
[58] Field of Search .................................. 244/158 R

[56] References Cited

U.S. PATENT DOCUMENTS 3,243,706  3/1966  Grisham ............................... 325/15
4,502,051  2/1985  Dondl .................................. 343/356

FOREIGN PATENT DOCUMENTS 1224159  9/1966  Fed. Rep. of Germany .

OTHER PUBLICATIONS

J. E. Draim, "Three- and Four Satellite Constellations for Optimal Northern Hemisphere Coverage", Aug. 20, 1984, AIAA-84-1766.
"Satellite Constellations for Optimal Northern Hemisphere Coverage", Oct. 4-7, 1983.
R. Luders, "Satellite Networks for Continuous Zonal Coverage", ARS Journal, Feb. 1961, pp. 179-184.
G. V. Mozhaev, "The Problem of the Continuous Earth Coverage and the Kinematically Regular Satellite Networks, I", Cosmic Research, pp. 755-762.
G. V. Mozhaev, "The Problem of Continuous Earth Coverage and the Kinematically Regular Satellite Networks, II", Cosmic Research, pp. 52-61.
D. C. Beste, "Design of Satellite Constellations for Optimal Coverage", IEEE Transactions on Aerospace Electronic Systems, May 1978, pp. 466-473.
A. H. Ballard, "Rosette Constellations of Earth Satellites," IEEE Transactions on Aerospace and Electronic Systems, vol. AES-16, No. 5, Sep. 198, pp. 656-673.
J. G. Walker, "Coverage Predictions and Selection Criteno for Satellite Constellations", Royal Aircraft Establishment, Dec. 1982.
J. G. Walker, "Circular Orbit Patterns Providing Whole Earth Coverage," Royal Aircraft Establishment, Technical Report No. 70211, Nov. 1970.

Primary Examiner—Galen Barefoot
Attorney, Agent, or Firm—Bernard, Rothwell & Brown

[57] ABSTRACT

Satellite hemispheric and global coverage with a minimum number of satellites includes a three-satellite elliptic orbit constellation covering the entire Northern (or Southern) Hemisphere and a four-satellite constellation giving continuous global coverage.

13 Claims, 4 Drawing Sheets

SATELLITE CONTINUOUS COVERAGE CONSTELLATIONS

This invention was made with government support under contract F49620-83-C-0006 awarded by the United States Air Force. The government has certain rights in this invention.

BACKGROUND OF THE INVENTION

1. Field of the Invention

This invention relates to improvements in satellite constellations for providing either hemispheric or continuous global coverage.

2. Background and Prior Art

Artificial satellites of earth have been known for some time and are useful in the fields of communication, navigation, surveillance, weather and meteorology, inter alia.

Because individual satellites are expensive and there is considerable cost in the launch and positioning of such satellites, it has been a problem under consideration for over 25 years as to how to distribute a minimum number of satellites in such a way that every point on earth or on a significant area of the earth is continuously in view of at least one satellite.

It is particularly desirable to provide continuous hemispheric coverage, especially as to the Northern Hemisphere so that at least one satellite will be in view at any time from any location in the hemisphere. While multiple satellite constellations are known and are being used to conduct reconnaissance and surveillance and to furnish various services such as communications, navigation, search and rescue for both civilian and military users, at the present time most of these constellations are based on circular geosynchronous satellites in either equatorial or inclined orbits. Since they are in circular orbits, they favor the Northern and Southern Hemispheres equally. However, most of the world's land mass, population, wealth, industry, military assets, and operating areas are located in the Northern Hemisphere.

It is also desirable for some systems to achieve continuous global coverage with a minimum number of satellites. This problem has been addressed for a number of years. In the 1960's it was thought that a minimum of six satellites were required for a constellation to have continuous coverage. In the 1970's it was thought that whole-earth coverage could not be maintained continuously with less than five satellites, see AIAA Paper 84-1996. The prior workers in the field of calculating the number of satellites usually assumed that the constellations would employ circular orbits. While elliptical orbits were recognized, circular orbits were thought to have advantage over elliptical orbits as regards to whole-earth coverage. The determination that at least five satellites are required to provide whole-earth coverage, while true for circular orbits, has been found by the inventor not to apply to elliptic orbits.

Current satellite constellations which use circular synchronous equatorial orbits have coverage gaps at or near the Poles of the earth, regardless of how many satellites are used. For example, three geostationary satellites spaced 120° apart on the Equator leave a triangular gap at both the North and South Poles. For certain applications and missions, it is highly desirable to close one or the other or both of these polar gaps. Generally the Northern Hemisphere is of greater interest since coverage of the North Pole and the entire Northern Hemisphere is quite important for many military, scientific and commercial applications. A commonly known solution resides in adding an extra ring of satellites in inclined orbits. However, this practice can be quite expensive given the high cost of producing, launching and maintaining these extra satellites in orbit. The use of a constellation arrangement which accomplishes the goal of continuous hemispherical or global coverage with the minimum number of satellites thus has obvious economic and operational advantages.

SUMMARY OF THE INVENTION

The present invention is based on the fact that continuous global coverage can actually be achieved with only four satellites and that continuous hemispherical coverage can actually be achieved with three satellites, provided they are placed in an optimal elliptic orbit constellation, with orbital planes parallel to the faces of a perturbed cube.

A three-satellite perturbed cubic constellation is described which gives continuous hemispheric coverage, e.g., the Northern Hemisphere, in which one satellite will be in view at any time from any location in the hemisphere. The three satellites are optimally arranged in inclined planes with slight to moderate eccentricity. The range of useable combinations of inclination and eccentricity is narrow at synchronous altitudes, but will widen somewhat at higher than synchronous altitudes. For continuous Northern Hemisphere coverage the arguments of perigee for all three orbits are placed at −90°, in the Southern Hemisphere. Inertially, the orbital planes are spaced 120° apart.

For continuous global coverage, a four-satellite constellation is used, composed of three slightly elliptic orbits using a cubic array for continuous hemispheric coverage, plus a single circular orbit equatorial satellite having a period one-half that of the other three satellites to cover the remaining gap in the opposite hemisphere.

BRIEF DESCRIPTION OF THE DRAWINGS

FIG. 1 depicts the Northern Hemisphere coverage of a basic circular orbit, cubic three-satellite constellation showing a trangular coverage gap, before perturbation into an elliptic constellation. This gap is offset from the polar axis and rotates about the polar axis at twice the frequency of the satellites themselves, changing size and shape as it rotates.

FIG. 2 depicts the cubic array of three satellites after perturbing the basic (circular orbit) array by reducing the inclination angle and increasing the eccentricity. The plane through the three satellites is shown shaded, lying above the Northern Hemisphere and not intersecting the earth's surface.

Also shown are the ground tracks of three satellites in synchronous (i.e., 24-hour period) orbits.

Figure 4:
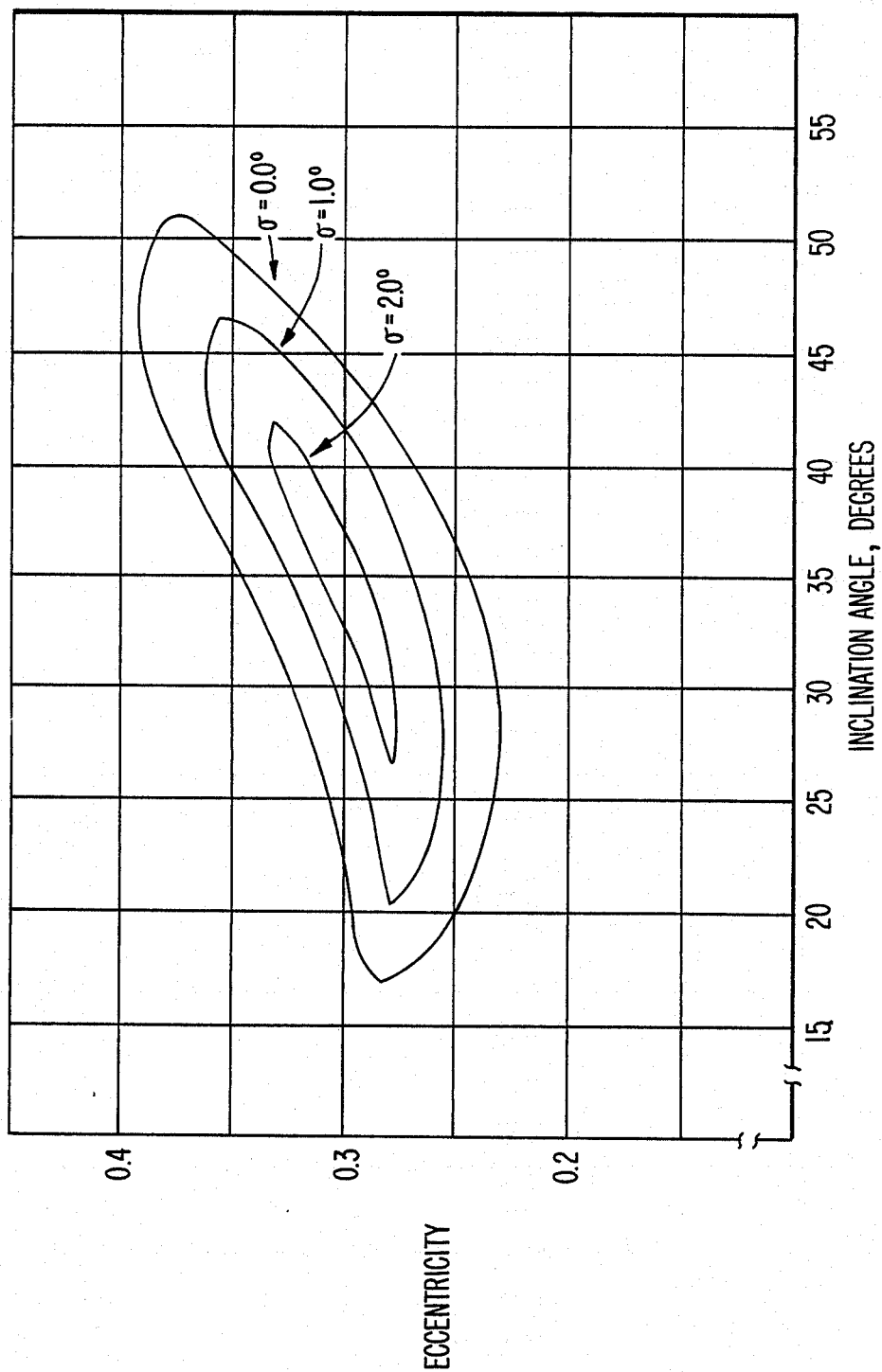

FIG. 4 is a chart showing the limits of eccentricity versus inclination at various visibility angles for a three-satellite synchronous, elliptic orbit, perturbed cubic constellation for continuous hemispheric coverage.

Figure 5:
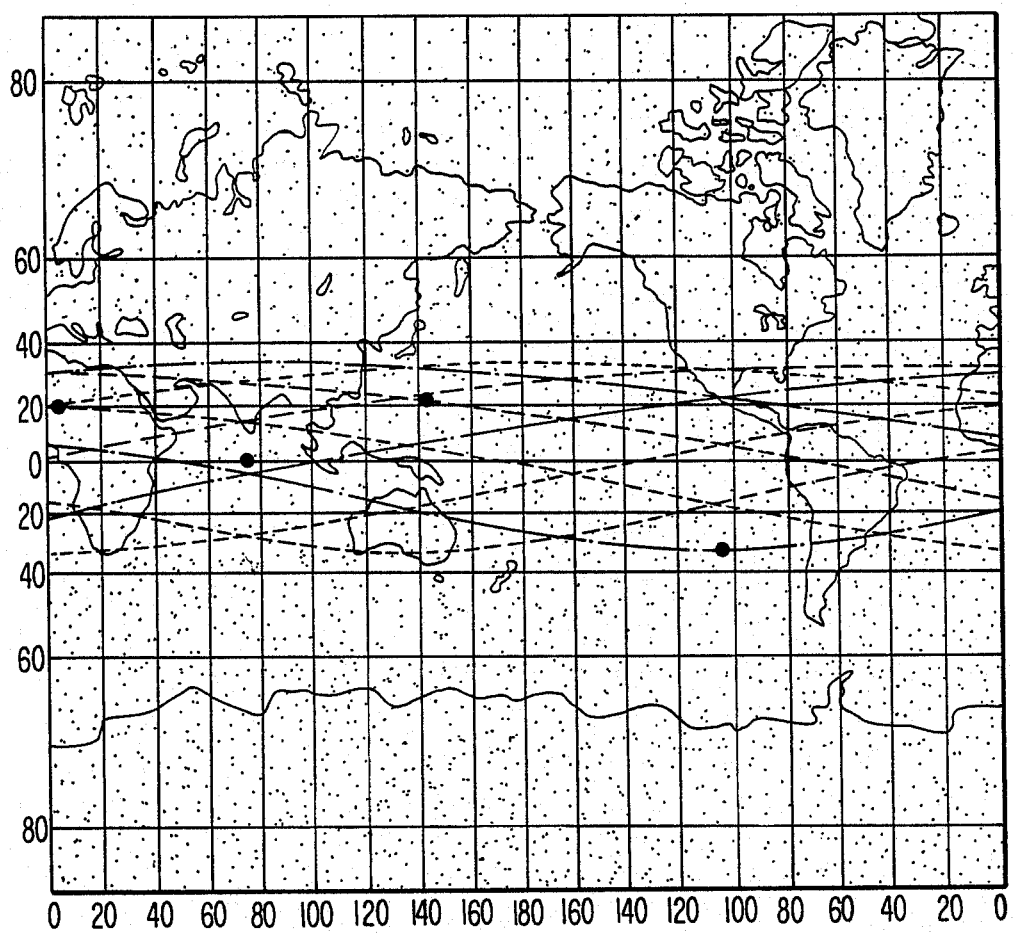

FIG. 5 is a Mercator projection of a four-satellite continuous coverage constellation with ground tracks showing the complete coverage of the globe (the shaded area). Although the Mercator projection does not cover the areas between 85° latitude and the poles, such areas are also continuously covered and would be included in the shaded (continuous coverage) area. The Figure illustrates constellation eccentricity and inclination limits for total Northern Hemisphere coverage of three-satellite constellation synchronous orbits, wherein parameter δ=look angle.

DETAILED DESCRIPTION OF THE PREFERRED EMBODIMENT

As a starting point, the basic (circular) cubic constellation has three satellites S-1 S-2 and S-3, and their orbits lie in the three faces of a tipped cube. If the cube is tipped so that a major diagonal is vertical, then each plane face of the cube will be inclined at 54.735° from the horizontal, or equatorial plane in this case. Each of the planes will be spaced 120° apart on the equator. That is, for each satellite a line of nodes is established. For each orbit an argument of perigee of −90° is specified to be used later to place each perigee in the Southern Hemisphere. This provides a reference for measuring either true or mean anomaly and allows for the later perturbation from circular to elliptical orbits. From the starting position, the satellites are first placed into circular orbits at true anomalies of 0°, 120°, and 240° respectively progressing to the East in the inertial reference frame. That is, satellite S-1 is place in a true anomaly of 0° in an inertial frame with its line of nodes at the reference value of 0°. Satellite S-2 with a line of nodes located 120° to the East of satellite S-1 is given a true anomaly of 120° (this effectively displaces satellite S-2 roughly 240° east of S-1). Finally satellite S-3 whose line of nodes is 240° to the east of S-1's line of nodes is assigned a true anomaly of 240°. This puts it roughly back at 120° to the east of S-1. The satellites are now in their starting positions. The circular orbital motion is then assumed to proceed through one complete constellation orbital period (a constellation orbital period is equal to an individual satellite). This is a basic, unperturbed, circular orbit cubic array, whose ephemerides are given in Table 1.

The characteristics of the plane passing through the three satellites of the basic circular orbit, cubic constellation through a complete constellation period show interesting results. First, the perpendicular to the satellite plane remains in a fixed angle from the polar axis and rotates about it. This angle is found to be 45.99°. Secondly, the perpendicular to the satellite plane rotates about the polar axis at twice the constellation frequency. Third, the satellite plane does not continuously pass through the center of the earth; instead it moves up and down on a polar axis with a frequency of motion three times the constellation frequency. Thus, six times per constellation period the satellite plane passes through the center of the earth. At these instants, similar triangular coverage gaps exist in both the Northern and Southern Hemispheres and these gaps will be offset from the polar axis. These gaps change size and rotate around either polar axis at twice the constellation frequency. See FIG. 1.

Figure 2:
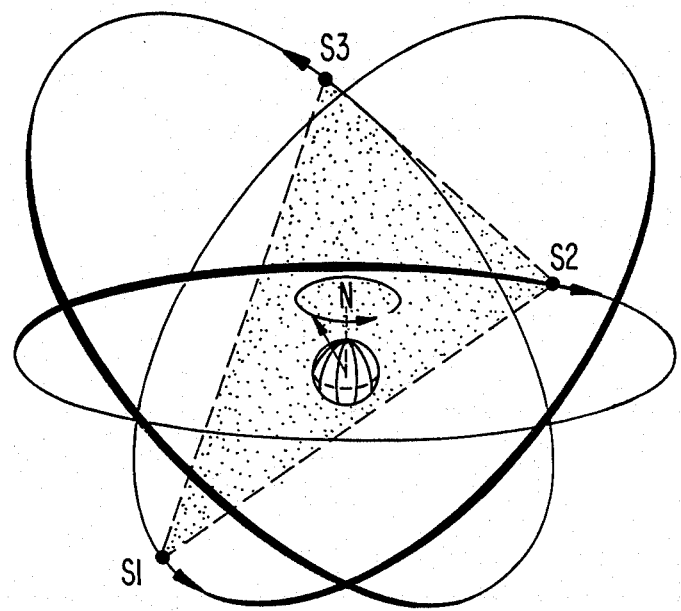
FIG. 2 is a schematic illustration of an elliptic cubic three-satellite constellation giving continuous coverage of the entire Northern Hemisphere. More Specifically.

The preferred embodiment for hemispheric coverage with a three-satellite constellation is depicted in FIG. 2. The satellites S-1, S-2 and S-3 are placed in three orbital planes, spaced 120° apart. The shaded area of FIG. 2 represents a plane which passes through the three satellites. By perturbing the basic cubic constellation (i.e., altering the inclination and eccentricity), the shaded plane can be made to oscillate about the polar axis while never intercepting the sphere representing the Earth. The frequency of oscillation is still twice the period of the basic constellation. Equivalently, the period of oscillation is one-half the frequency of the basic constellation satellites.

Altering the basic circular orbit cubic constellation described above, by (a) optimally reducing the inclination of all three planes, (b) substituting mean anomaly for true anomaly at the respective starting positions, and (c) introducing an optimal eccentricity, results in the Northern Hemisphere coverage gap being suppressed throughout the constellation period at the expense of allowing the size of the Southern Hemisphere gap to increase. A range of inclination-eccentricity combinations can be used. See FIG. 4 for a chart of inclination versus eccentricity for various visibility or "look" angles for a three-satellite synchronous hemispheric coverage model. For this elliptical-orbit cubic array example, 24 hours was used as the period, 30° for the orbital inclination, and 0.3 for the eccentricity of all three orbits. An isometric diagram of the perturbed elliptical cubic constellation is shown in FIG. 2. The minimum visibility look angle (angle at which satellites are viewed above the horizon) will be a function of the separation distance of the satellite planes from the earth's surface.

The constellation of this invention will result in an oscillating plane which does not intersect the earth and in fact cuts the polar axis at points above the North Pole. Therefore, it will provide continuous hemispheric coverage. It also exhibits oscillation frequency equal to twice the constellation frequency. The ephemerides of the perturbed cubic constellation of this invention which results in continuous hemispheric coverage of the Northern Hemisphere is given in Table 2. For this example the basic satellite or constellation period is 24 hours (often referred to as a synchronous period as it is in synchronization with the earth's rotation rate). For other than 24-hour constellation, the longitudes of the

TABLE 1

| Sat. No. | Period (Hours) | Inclination | Eccentricity | Argument of Perigee | Longitude of Ascending Node | Mean Anomaly | Right Ascension of Ascending Node |
| --- | --- | --- | --- | --- | --- | --- | --- |
| 1 | 24 | 54.736° | 0 | −90° | 0° | 0° | 0° |
| 2 | 24 | 54.736° | 0 | −90° | 120° | 240° | 240° |
| 3 | 24 | 54.736° | 0 | −90° | 240° | 120° | 120° | ascending nodes will vary, and the constellation must be constructed using the right ascensions for the ascending nodes in an inertial reference frame.

TABLE 2

| Sat. No. | Period (Hours) | Inclination | Eccentricity | Argument of Perigee | Longitude of Ascending Node | Mean Anomaly | Right Ascension of Ascending Node |
|---|---|---|---|---|---|---|---|
| 1 | 24 | 30° | 0.28 | −90° | 50° | 0° | 0° |
| 2 | 24 | 30° | 0.28 | −90° | 170° | 240° | 240° |
| 3 | 24 | 30° | 0.28 | −90° | 290° | 120° | 120° |

This invention contemplates a range of inclination angles and eccentricities roughly centered on the values of Table 2, which will still provide continuous hemispheric coverage. This range of values is given in FIG. 4. Thus, the exact values given in Table 2 are not required, and nearby values may still give satisfactory results and are encompased in the present invention.

The period in hours may vary from a minimum of 16.1 hours upwardly and still give continuous coverage. The inclination may vary within a range of 15°–50° for 24-hour constellation periods, and over an even greater range for higher than synchronous constellations. The eccentricity may also vary in accordance with variation in the inclination. FIG. 4 is a chart plotting eccentricity against inclination angle for total Northern Hemisphere coverage (with a three-satellite cubic constellation at synchronous altitude) for various visibility or look angles. The optimum choice for the three-satellite continuous hemispheric coverage design is about 35° inclination with about 0.3 eccentricity.

Figure 3:
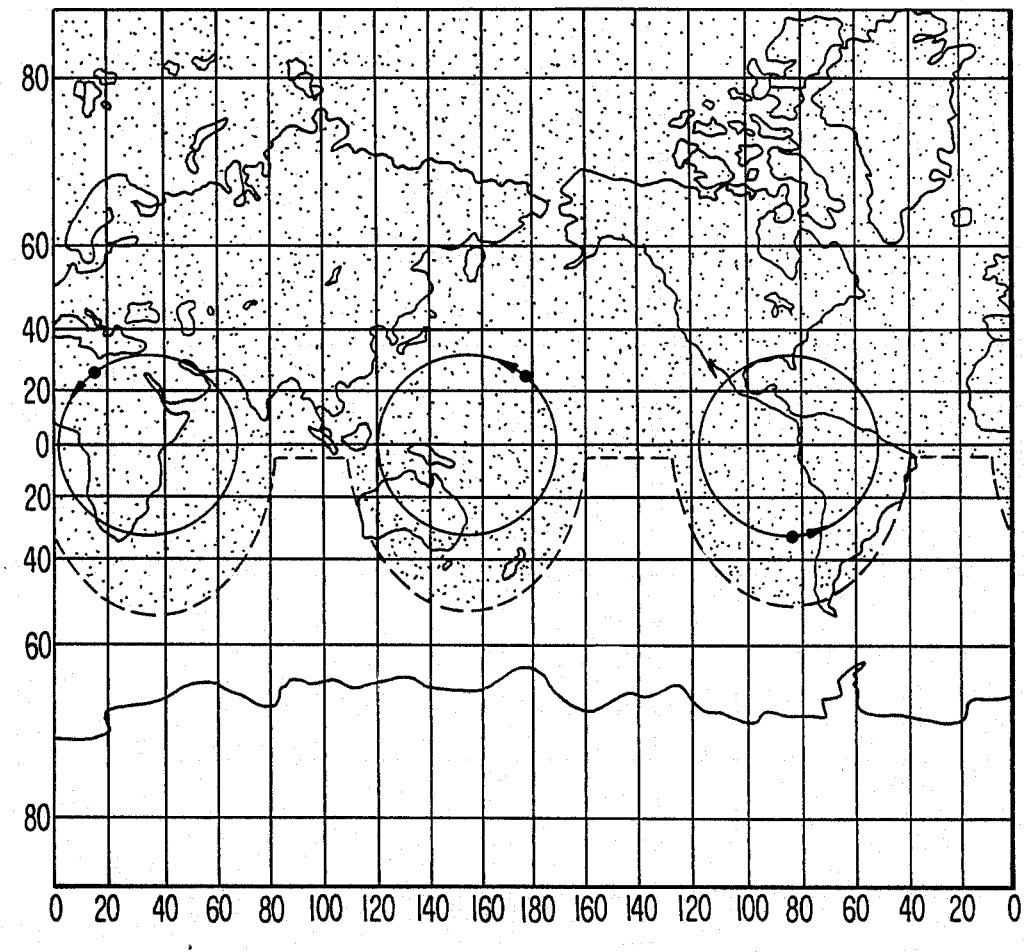
FIG. 3 is a Mercator chart showing the area of continuous Northern Hemisphere single coverage and satellite ground tracks with typical satellite starting positions. This standard Mercator projection shows the areas of the globe (in addition to the North Pole which cannot be shown on the Mercator projection) that are covered by the three-satellite constellation of FIG. 2.

FIG. 3 shows the effect of the three-satellite constellation in terms of coverage and ground tracks for a synchronous (24-hour) constellation. Both continuous coverage areas and satellite ground tracks have been plotted on a standard Mercator chart. Since there is no restriction in selecting the longitudes of the ascending nodes (so long as they are kept 120° apart), values were selected that provide coverage of the major Southern Hemisphere land masses of Africa, Australia and South America. Thus, the example three-satellite constellation not only provides continuous coverage of the Northern Hemisphere, but also continuous coverage of all of the world's most populated land masses. It should be noted that there is a minumum orbital altitude for continuous hemispheric coverage with this constellation, namely, a particular value of semi-major axis corresponding to a unique period; any lower values will lead to an intersection of the earth's surface by the satellite plane or planes. For Northern Hemisphere continuous coverage constellation, this minimum constellation period is 16.1 hours. Any period less than this will result in periodic coverage gaps even though the optimum ephemerides are used.

If, for some reason, continuous Southern Hemisphere coverage is desired (instead of Northern Hemishpere) the constellation may be merely turned upside-down, with all the perigees of the satellite orbits being placed in the Northern Hemisphere (i.e., arguments of perigee become −270° or +90°).

It has been found that the entire globe can be continuously covered with four satellites utilizing a three-satellite cubic constellation similar to that disclosed above, plus a fourth satellite. When using the three-satellite constellation, it is recognized that the only gap in coverage occurs in the Southern Hemisphere and that this gap rotates around the South Pole at twice the constellation frequency. Thus, it is possible that a single additional satellite with a frequency twice that of the other three and which is in an equatorial orbit could cover the remaining gap in the Southern Hemisphere. For this to happen, however, the original three satellites must have an altitude high enough (i.e., a period lengthy enough) and an eccentricity which does not exceed a critical value. A 96-hour constellation period was employed and selected because it is an integral multiple of 24 hours. Using three satellites with a 96-hour period means that the circular equatorial satellite must have one-half that period, or a period of 48 hours.

Figure 1:
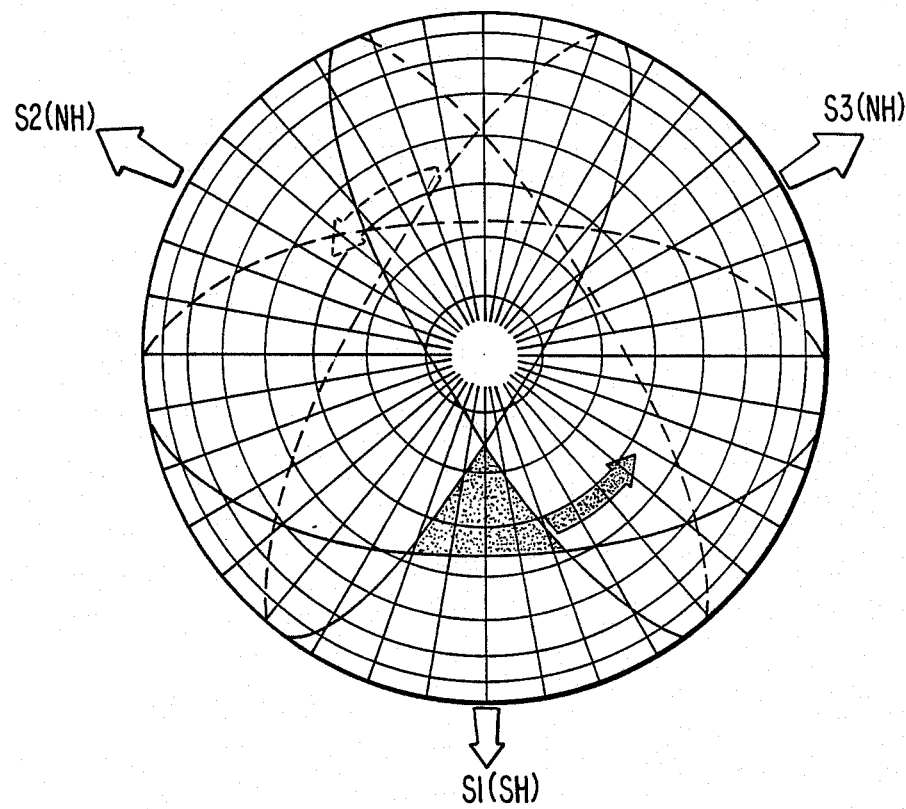
FIG. 1 illustrates a basic cubic constellation showing triangular coverage gaps looking down from the North Pole (non-rotating Earth). The triangular gaps rotate both around their own axis and about the polar axis as shown. More specifically.

The orbital parameters (ephemerides) of the perturbed cubic constellation are given in Table 3 for satellites S1, S2 and S3. With no eccentricity there would be two triangular coverage gaps, one in the Northern Hemisphere and one in the Southern Hemisphere, both rotating about an axis offset from the polar axis as shown in FIG. 1. By selecting a judicious combination of inclination angle and eccentricity, the Northern Hemisphere gap may be completely suppressed and closed (at the expense of making the Southern Hemisphere gap larger). If the satellite orbits are high enough, i.e., have a period exceeding 78 hours, and have a fairly low eccentricity, i.e., less than 0.15, then the entire Northern Hemisphere will be continuously in view of one or more of the three satellites and the South Pole can also be kept in view. A fourth satellite is then added to the constellation in a circular equatorial orbit with a period one-half the period of the other three. Since the Southern Hemisphere gap oscillates about the South Pole at twice the constellation frequency, satellite number four will cover this gap provided its coverage extends down to the visibility arc intersection of the two higher altitude satellites with the most southernly latitudes. With this arrangement, the four satellites in combination can provide complete global coverage. That is, from any point on the earth at any time there will be at least one of the four satellites in view.

Table 3 gives the ephemerides of this 96-hour four-satellite continuous global coverage constellation. For other than 96-hour periods, the same ephemerides may be used in the inertial frame: the right ascension of the ascending node applies (but the longitudes of the ascending nodes will change due to earth rotation).

TABLE 3

| Sat. No. | Period (Hours) | Inclination | Eccentricity | Argument of Perigee | Longitude of Ascending Node | Mean Anomaly | Right Ascension of Ascending Node |
|---|---|---|---|---|---|---|---|
| 1 | 96 | 33° | 0.13 | −90° | 45° | 0° | 0° |

TABLE 3-continued

| Sat. No. | Period (Hours) | Inclination | Eccentricity | Argument of Perigee | Longitude of Ascending Node | Mean Anomaly | Right Ascension of Ascending Node |
|---|---|---|---|---|---|---|---|
| 2 | 96 | 33° | 0.13 | −90° | 165° | 240° | 240° |
| 3 | 96 | 33° | 0.13 | −90° | 285° | 120° | 120° |
| 4 | 48 | 0° | 0 | 0° | 90° | 0° | 180° |

Satellite number 4 is always in an equatorial orbit and always at one-half the period of the other satellites. For the other three satellites the inclination and eccentricity can vary within limited ranges, for periods greater than 78 hours.

A Mercator projection chart of coverage is shown in FIG. 5 illustrating the satellite ground tracks and the complete coverage (shaded areas). Although the Mercator projection does not cover the areas between 85° latitude and the Poles, this area is also continuously covered and would be included in the shaded continuous coverage area.

It can be seen that the satellite constellations of this invention provide either continuous coverage of the Northern Hemisphere along with most of the major land masses of the earth with a three-satellite constellation or continuous global coverage with a four-satellite constellation. Variations within the skill of the art may be apparent and the invention is not limited to the specific embodiments, but its scope is defined in the following claims.

I claim:

1. A communication system comprising a constellation of satellites comprising three artificial satellites orbiting earth, said three satellites having communication means for providing communication via the means of at least one satellite at all times with the earth, said three satellites having orbits oriented parallel to faces of a perturbed cube, each orbit of said three satellites have a period, the orbits of said three satellites providing continuous coverage by said three satellites of at least one hemisphere of earth wherein at any time at least one of said three satellites is above the horizon at any point in at least one hemisphere of earth, said three satellites being in respective inclined, elliptical orbital planes spaced 120° apart, each orbit having a degree of inclination and amount of eccentricity varying according to the period to provide continuous coverage.

2. A satellite constellation as in claim 1 wherein the minimum period is about 16.1 hours, and any greater period is allowable.

3. A satellite constellation as in claim 1 wherein the inclination varies from 15°–50°.

4. A satellite constellation as in claim 1 wherein the minimum period for three satellites is 72 hours and any greater period is allowable, and further comprises a fourth satellite having one-half the period of the other three satellites and in a circular equatorial orbit.

5. A satellite constellation as in claim 1 or 4 in which said three satellites having orbits oriented parallel to faces of a perturbed cube have common periods wherein the mean anomalies of the three common period satellites are 120° apart.

6. A satellite constellation as in claim 1 in which said three satellites having orbits oriented parallel to faces of a perturbed cube have common periods wherein the argument of perigee is −90°, for the three common period satellites.

7. A communication system comprising a satellite constellation providing continuous coverage by said constellation of every spot on earth, the constellation consisting of four artificial satellites orbiting earth said four satellites having communication means for providing communication via the means of at lease one satellite at all times with the earth, three satellites of the constellation being in inclined elliptical planes spaced inertially 120° apart, having a minimum period of 72 hours, with a fourth circular orbit satellite having one-half the period of the other three satellites and positioned in an equatorial orbit.

8. A method of deploying a constellation of artificial satellites communicating with and orbiting earth comprising placing three satellites into respective earth orbits oriented parallel to faces of a perturbed cube, each orbit of said three satellites having a period, the orbits of said three satellites providing continuous coverage by said three satellites of at least one hemisphere of earth wherein at any time at least one of said three satellites is above the horizon at any point in at least one hemisphere of earth, said three satellites being deployed in respective inclined elliptical orbital planes spaced 120° apart, each orbit having a degree of inclination and amount of eccentricity varying according to the period to provide continuous coverage.

9. The method of claim 8 wherein the period is about 16.1 hours or greater.

10. The method of claim 8 wherein the inclination varies from 15°–50°.

11. The method of claim 8 wherein the period is about 72 hours or greater, the method further comprising deploying a fourth satellite in earth orbit, the fourth satellite having one-half the period of the other three satellites and in a circular equatorial orbit.

12. The method of claim 8 or 11 in which said three satellites having orbits oriented parallel to faces of a perturbed cube have common periods wherein the mean anomalies of the three common period satellites are 120° apart.

13. The method of claim 8 in which said three satellites having orbits oriented parallel to faces of a perturbed cube have common periods wherein the argument of perigee is −90°, for the three common period satellites.

* * * * *